(12) United States Patent
Wieland et al.

(10) Patent No.: US 9,316,406 B2
(45) Date of Patent: Apr. 19, 2016

(54) PROCESS CHAMBER INCORPORATING AN ARRANGEMENT FOR INJECTING GASEOUS FLUID THEREINTO

(71) Applicant: Duerr Systems GmbH, Bietigheim-Bissingen (DE)

(72) Inventors: Dietmar Wieland, Waiblingen (DE); Oliver Iglauer, Stuttgart (DE); Christof Knuesel, Munich (DE); Marius Winkler, Pleidelsheim (DE)

(73) Assignee: DUERR SYSTEMS GMBH, Bietigheim-Bissingen (DE)

( * ) Notice: Subject to any disclaimer, the term of this patent is extended or adjusted under 35 U.S.C. 154(b) by 309 days.

(21) Appl. No.: 13/872,880

(22) Filed: Apr. 29, 2013

(65) Prior Publication Data

US 2013/0232801 A1 Sep. 12, 2013

Related U.S. Application Data

(63) Continuation of application No. PCT/EP2011/066154, filed on Sep. 16, 2011.

(30) Foreign Application Priority Data

Oct. 28, 2010 (DE) .......................... 10 2010 043 087

(51) Int. Cl.
| | |
|---|---|
| *F15C 1/16* | (2006.01) |
| *F24F 9/00* | (2006.01) |
| *F26B 25/06* | (2006.01) |
| *F26B 25/00* | (2006.01) |
| *F26B 19/00* | (2006.01) |

(Continued)

(52) U.S. Cl.
CPC . *F24F 9/00* (2013.01); *F26B 15/10* (2013.01); *F26B 15/14* (2013.01); *F26B 21/004* (2013.01);

(Continued)

(58) Field of Classification Search
CPC ............ B60S 3/002; F24F 9/00; F26B 15/10; F26B 21/004; F26B 21/028; F26B 25/12; F26B 15/14; F26B 21/04; F26B 25/008
USPC ....... 137/808; 33/487; 454/188; 34/225, 230, 34/231, 270, 666
See application file for complete search history.

(56) References Cited

U.S. PATENT DOCUMENTS 1,606,442 A 11/1926 Nichols
2,062,187 A * 11/1936 Morrison ........................ 62/408

(Continued)

FOREIGN PATENT DOCUMENTS

| AT | 194570 B | 1/1958 |
|---|---|---|
| AT | 505391 A4 | 1/2009 |

(Continued)

OTHER PUBLICATIONS

English translation of International Preliminary Report on Patentability of the international searching authority dated May 10, 2013 in international patent application PCT/EP2011/066154 on which the claim of priority is based.

(Continued)

*Primary Examiner* — Kevin Murphy
*Assistant Examiner* — Kelsey Rohman
(74) *Attorney, Agent, or Firm* — Walter Ottesen, P.A.

(57) ABSTRACT

A process chamber (5) has an interior space (39). In the interior space (39), there is a receiving region (15) for workplaces (3). The process chamber (5) has an opening (12, 14) for the entry and exit of workplaces (3). The process chamber includes an arrangement (17, 19, 25, 29, 33, 37, 35) for injecting gaseous fluid into the interior space (39). The arrangement for injecting gaseous fluid has at least one nozzle (17, 19) for producing a fluid flow curtain (21, 23) between the opening (12, 14) and the receiving region (15) for workplaces (3).

16 Claims, 10 Drawing Sheets

(51) Int. Cl.
  *F26B 15/14* (2006.01)
  *F26B 21/04* (2006.01)
  *F26B 15/10* (2006.01)
  *F26B 21/00* (2006.01)
  *F26B 21/02* (2006.01)
  *F26B 25/12* (2006.01)
  *B60S 3/00* (2006.01)
  *F26B 21/14* (2006.01)
  *F26B 23/02* (2006.01)

(52) U.S. Cl.
  CPC ............... *F26B 21/028* (2013.01); *F26B 21/04* (2013.01); *F26B 25/008* (2013.01); *F26B 25/12* (2013.01); *B60S 3/002* (2013.01); *F26B 21/14* (2013.01); *F26B 23/022* (2013.01); *F26B 2210/12* (2013.01)

(56) References Cited

U.S. PATENT DOCUMENTS

| | | | |
|---|---|---|---|
| 3,947,235 A | | 3/1976 | Bornert |
| 4,984,740 A | * | 1/1991 | Hodge ........................ 239/232 |
| 5,169,414 A | | 12/1992 | Panzica et al. |
| 5,566,468 A | | 10/1996 | Graeff |
| 5,915,816 A | | 6/1999 | Graff |
| 6,684,528 B1 | * | 2/2004 | Morrison ........................ 34/666 |
| 2008/0229608 A1 | * | 9/2008 | Krizek et al. .................. 34/236 |
| 2009/0272409 A1 | * | 11/2009 | Petit ............................... 134/32 |

FOREIGN PATENT DOCUMENTS

| | | |
|---|---|---|
| DE | 1 095 497 B | 12/1960 |
| DE | 1154 252 B | 9/1963 |
| DE | 103 13 113 A1 | 10/2004 |
| GB | 2 123 936 A | 2/1984 |
| WO | WO 2010/122121 A2 | 10/2010 |
| WO | WO 2011/160778 A1 | 12/2011 |

OTHER PUBLICATIONS

International Search Report dated Feb. 1, 2012 of international application PCT/EP2011/066154 on which this application is based.

* cited by examiner

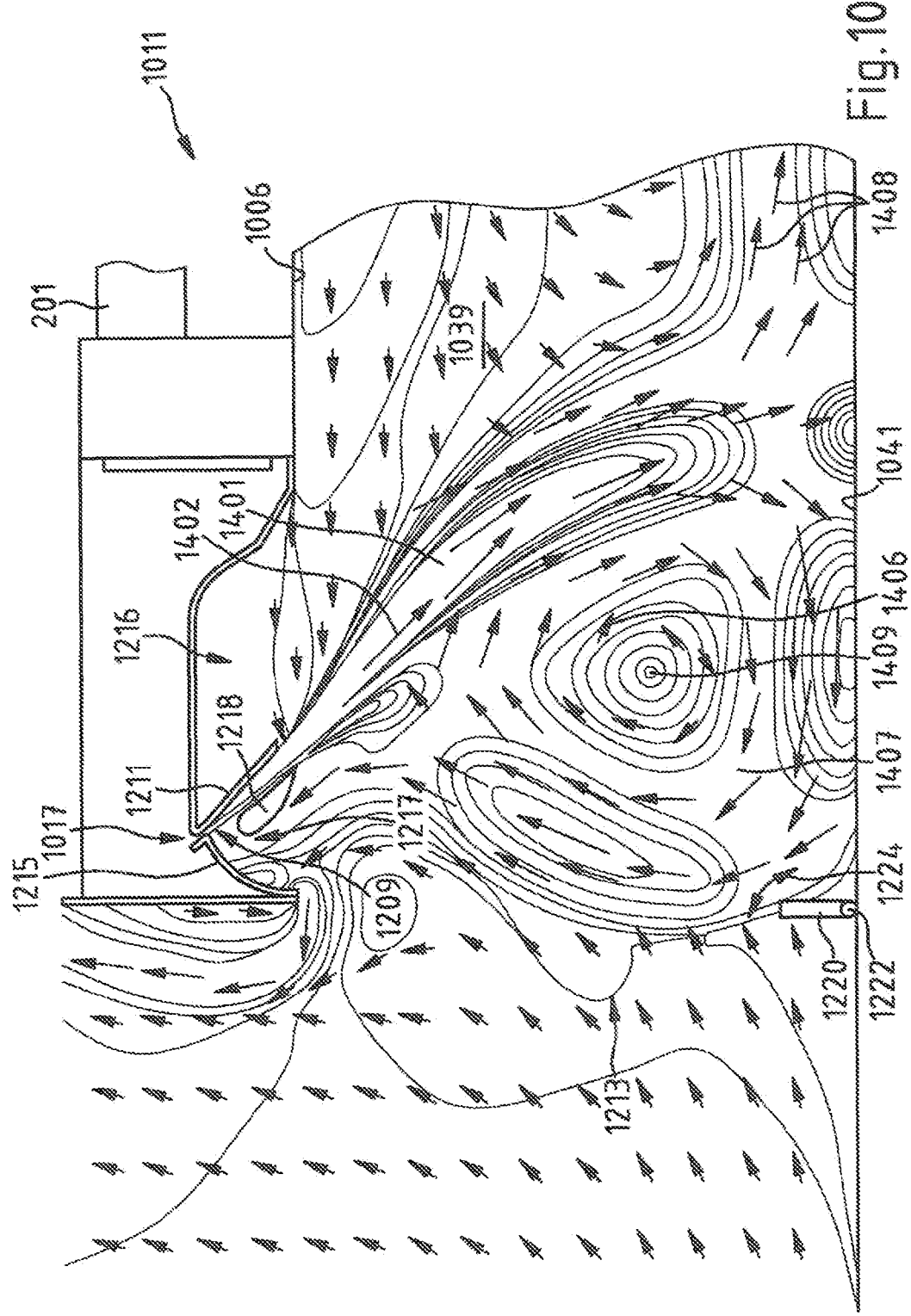

PROCESS CHAMBER INCORPORATING AN ARRANGEMENT FOR INJECTING GASEOUS FLUID THEREINTO

CROSS REFERENCE TO RELATED APPLICATIONS

This application is a continuation application of international patent application PCT/EP2011/066154, filed Sep. 16, 2011, designating the United States and claiming priority from German application 10 2010 043 087.0, filed Oct. 28, 2010, and the entire content of both applications is incorporated herein by reference.

FIELD OF THE INVENTION

The invention relates to a process chamber with an interior space comprising a receiving region for workpieces, with an opening for supplying workpieces and with a device for injecting gaseous fluid into the interior space.

BACKGROUND OF THE INVENTION

In production works for the painting and coating of vehicle bodies, drying installations are used for the drying of vehicle bodies that have been freshly painted or coated with an anti-corrosive. These drying installations have a process chamber which is formed as a drying tunnel and into which hot air is injected. In the drying tunnel there is a drying zone. The drying zone is a receiving region for workpieces in the form of vehicle bodies. In order to dry the vehicle bodies, they are moved through the drying tunnel on a conveying device. The layer of paint or coating of the vehicle bodies that is to be dried may be impaired, by contaminants, in particular dust particles.

Furthermore, gaseous fluid, and with it heat, can escape from the interior space through an opening for supplying workpieces.

SUMMARY OF THE INVENTION

It is an object of the invention to provide a process chamber that has an at least temporarily opened interior space, in the case of which an efficient thermal separation of this interior space from the surroundings is made possible by particularly simple means.

This object is achieved by a process chamber of the type mentioned heretofor wherein the arrangement for injecting gaseous fluid includes at least one nozzle or at least one aperture for producing a fluid flow curtain between the opening and the receiving region for workpieces. The nozzles or apertures preferably serve as outlet openings for air heated above ambient temperature or compressed above ambient pressure (or a correspondingly processed inert gas such as $CO_2$ or $N_2$). In particular, the process chamber contains a gaseous fluid that is assigned a temperature level of over 100° C. or a differential temperature in comparison with the surroundings of the process chamber of over 50° K. In an exemplary embodiment, fluid is made to flow into the process chamber approximately perpendicularly downward from above. In a further preferred exemplary embodiment, the fluid flowing in through the nozzle has a temperature that is higher or lower by more than 20° K than the fluid contained (more or less at rest) in the process chamber. Hereinafter, reference is mainly made to a rigid or adjustable nozzle geometry, although the invention can also foe respectively realized with one or more simple apertures.

The receiving region for workpieces is preferably designed in the form of a tunnel. It has a floor and a ceiling. If the at least one slot nozzle is designed with a substantially rectangular outlet cross section, the gaseous fluid can be supplied by way of the ceiling of the receiving region with an oblique direction of flow with respect to the floor in such a way that on the side of the fluid flow curtain that is facing the intake opening there forms a flow vortex, which is at least partially mixed with injected fluid.

One idea of the invention is in particular that the fluid curtain can be produced with reduced energy expenditure if the gaseous fluid injected into the interior space by way of the at least one nozzle is guided on a directing contour which protrudes into the interior space. It is of advantage in particular if this directing contour can be pivoted. This makes it possible to set the fluid flow curtain with reference to the horizontal. An angle of between 90° and 40° between the outflow direction and the horizontal is preferably set. In particular, the pivoting of the directing contour can achieve the effect that workpieces are not impaired as they enter or leave the process chamber.

It is of advantage in particular if on the side of the directing contour that is facing the opening there is arranged a wall which, with the directing contour, forms a mixing chamber. This mixing chamber is positioned in such a way that fluid from a flow vortex formed on a side of the fluid curtain that is facing the opening (that is, outward from the interior space of the process chamber) is mixed with air from the region of the opening. Here, gaseous fluid flowing through the nozzle or the aperture is drawn into the interior space.

The wall may have one or more openings for the passing through of circulated air from the region of the opening.

If a secondary chamber acting as a "dead space" for gaseous fluid is formed on a side of the directing contour that is facing away from the mixing chamber, it can be ensured that the flow of gaseous fluid leaving the nozzle or aperture is guided along the directing contour without any flow separation. Lower flow rates preferably prevail in the "dead space" than outside the dead space. The arrangement of an additional directing vane in the mixing chamber allows the effect to be achieved that great amounts of fluid from the flow vortex are returned into the flow curtain.

If an end wall which, with the directing contour, defines a retaining space is arranged on the side of the directing vane that, is facing the intake opening, circulated air from the region of the intake opening that is diverted in the region of the directing vane into a peripheral region of the interior space can be kept back from escaping into the open.

The end wall favorably has one or more openings for the passing through of circulated air from the region of the intake opening. The at least one nozzle may have a device for setting the amount of flow of fluid passing through the nozzle. If multiple nozzles with a device for setting the amount of flow of fluid passing through the nozzle are provided, the fluid flow curtain between the intake opening and the receiving region for workpieces can be set differently in different sections.

The arrangement for injecting or blowing in gaseous fluid may have a heating device for heating the gaseous fluid. This allows the effect to be achieved that no condensate, for example condensed water, occurs in the region of openings of the process chamber. The process chamber is suitable for use in a drying and/or hardening installation. In particular, the process chamber may be integrated in a painting installation.

In the process chamber, the fluid curtain is produced with gaseous fluid which has been subjected to pressure and is passed through a nozzle. In this case, air from the region of an opening of the process chamber is admixed with the gaseous fluid flowing from the nozzle in the mixing chamber arranged alongside the nozzle. The gaseous fluid passed through the nozzle is guided along a directing contour bounding the mixing chamber. This directing contour separates the mixing chamber from a secondary chamber, acting as a dead space for gaseous fluid and arranged alongside it.

The process chamber may be operated in particular in such a way that a flow of gaseous fluid passed through a nozzle for producing a fluid flow curtain between the opening and the receiving region for workpieces is throttled or interrupted and/or has the direction of the fluid flow curtain changed when a workplace is moved through the opening. This ensures that the fluid flow curtain does not damage the surface of the coating of workpieces that are moved into and out of the process chamber.

BRIEF DESCRIPTION OP THE DRAWINGS

The invention will now foe described with reference to the drawings wherein:

FIG. 10 shows a longitudinal section of a further lock.

DESCRIPTION OF THE PREFERRED EMBODIMENTS OF THE INVENTION

Figure 1:
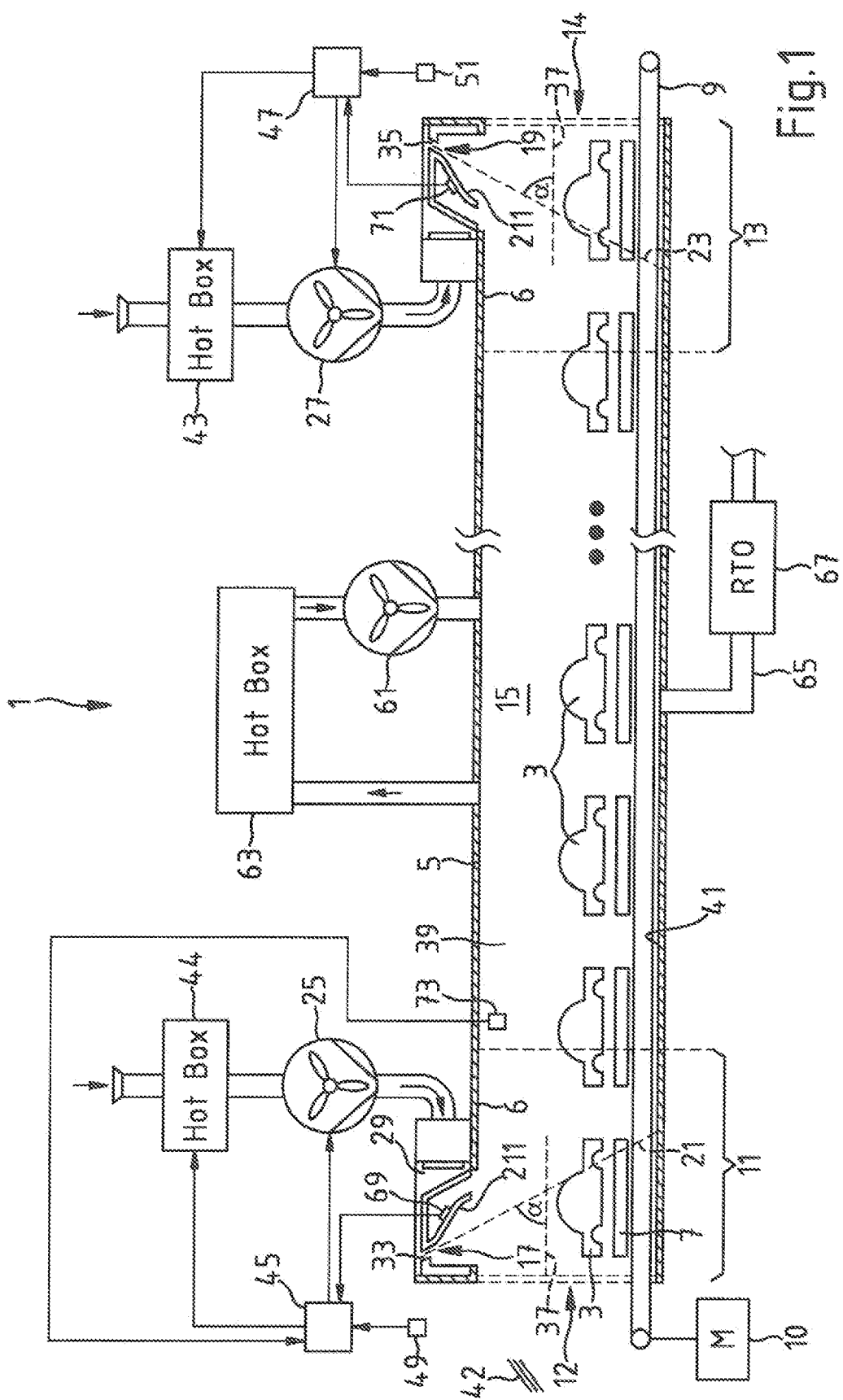
FIG. 1 is a schematic showing a drying installation for vehicle bodies.

The installation 1 for drying metallic workpieces that is shown in FIG. 1 is designed in particular for vehicle bodies 3. The installation 1 comprises a process chamber formed as a drying tunnel 5. The vehicle bodies 3, which are mounted on skids 7, can foe moved through the drying tunnel 5 by a conveying device 9. The conveying device 9 has an electric drive 10. The drying tunnel 5 is lined with sheet metal.

The tunnel 5 has an intake lock 11 with an opening 12 and an exit lock. 13 with an opening 14. The drying tunnel 5 comprises a drying section 15, which lies between the intake lock 11 and the exit lock 13. The drying section 15 is a receiving region for workpieces. The drying section 15 is preferably configured such that approximately fifteen vehicle bodies 3 freshly coated with a paint and/or a solvent containing substrate can be dried therein more or less at the same time. For this purpose, the drying section 15 is designed, for example, with a length L=40 m, a clear width (b) wherein (b) is 1.4 m<b<1.60 m and a clear elevation (h) wherein (h) is 2.60 m<h<2.00 m.

In, the case of a particularly preferred embodiment, clocked intervals of 5.2 m, 30 units per hour and a residence time of 0.5 hour result in a tunnel length of 78 m (outer width (b) is 3 m to 4.6 m, outer height (h) is 2.8 m to 3.3 m).

In the drying section 15, air for drying is circulated by a fan 61. To keep the air for drying at a constant temperature, the air is thereby passed through a heating device 63. To discharge the solvent from paint or coatings of the vehicle bodies from the gas atmosphere in the drying tunnel 5, in the installation 1 there is a conduit 65 for exhaust air, which conducts air that is loaded with solvent out of the drying tunnel 5 to a cleaning reactor 67.

In the intake lock 11 and the exit lock 13 of the drying tunnel 5 there are respective nozzles (17, 19) for producing corresponding fluid flow curtains (21, 23). The nozzles (17, 13) are supplied with fresh, air by ventilators for fresh air (25, 27), each acting as a compressor, through a chamber (29, 31) arranged above the ceiling 6 of the drying tunnel 5. The nozzles (17, 19) preferably have a narrow slot-shaped opening (33, 35), which extends substantially over the width of the drying tunnel 5. The slot-shaped opening (33, 35) of the nozzles (17, 19) opens out into the interior space 39 of the drying tunnel 5. The fluid flowing out from the nozzles (17, 19) is guided on a baffle having a guide contour 211 into the interior space of the drying tunnel. There is a temperature sensor (69, 71) on the directing contour 211 for an advantageously possible detection of the temperature of the fluid supplied to the interior space 39 by way of the nozzles (17, 19).

The fluid flow curtains (21, 23) preferably each extend at an angle of $40° \leq \alpha \leq 60°$ with respect to the horizontal 37, The fluid flow curtain (21, 23) is directed into the interior space 39 of the drying tunnel 5. The fluid flow flowing out of the nozzles (17, 19) thereby widens toward the floor 41 of the drying tunnel 5. With increasing distance from the opening (33, 35) of the nozzles (17, 19), the velocity or rate of the flow of the fresh air forming the fluid curtain (21, 23) as a gaseous fluid decreases. The fluid flow curtain (21, 23) separates the gas atmosphere in the interior space 39 of the drying tunnel 5 from the ambient air 42.

For detecting the concentration of solvent in the gas atmosphere of the drying tunnel 5, a solvent sensor 73 is arranged in the drying section 15. The gaseous fluid supplied to the nozzles (17, 19) in the form of air is preheated in a heating device (43, 44) to a desired process temperature $T_{set}$, which preferably lies in a temperature range of $200° C. \leq T_{set} \leq 250° C.$ If the fluid flow curtain (21, 23) consists of fresh air, it can be ensured that a lower explosion limit for organic solvents is not exceeded in the drying section 15 of the drying tunnel 5. The preheating of the fluid supplied ensures that no condensate occurs in the intake lock 11 and the exit lock 13 of the drying tunnel 5.

For keeping within an explosion limit in the drying section 15, it is possible in particular that a defined amount of fresh, air is provided by way of the nozzles (17, 19). For setting the amount of fresh air supplied by way of the nozzles (17, 19) into the drying tunnel 5 there is advantageously a control device (45, 47) in the installation for drying. By means of the control device (45, 47), the fluid flow leaving the nozzles (17, 19) is set. The setting of the fluid flow takes place in dependence on the number of vehicle bodies moved through the drying zone 15 of the drying tunnel that is detected by means of a sensor (49, 51) and on the basis of the signals of the temperature sensors (69, 71) and the solvent sensor 73. The fluid flow is thereby set such that, during operation of the installation 1, the so-called lower explosion limit of the composition of the gas atmosphere is not exceeded in the drying tunnel 5.

Figure 2:
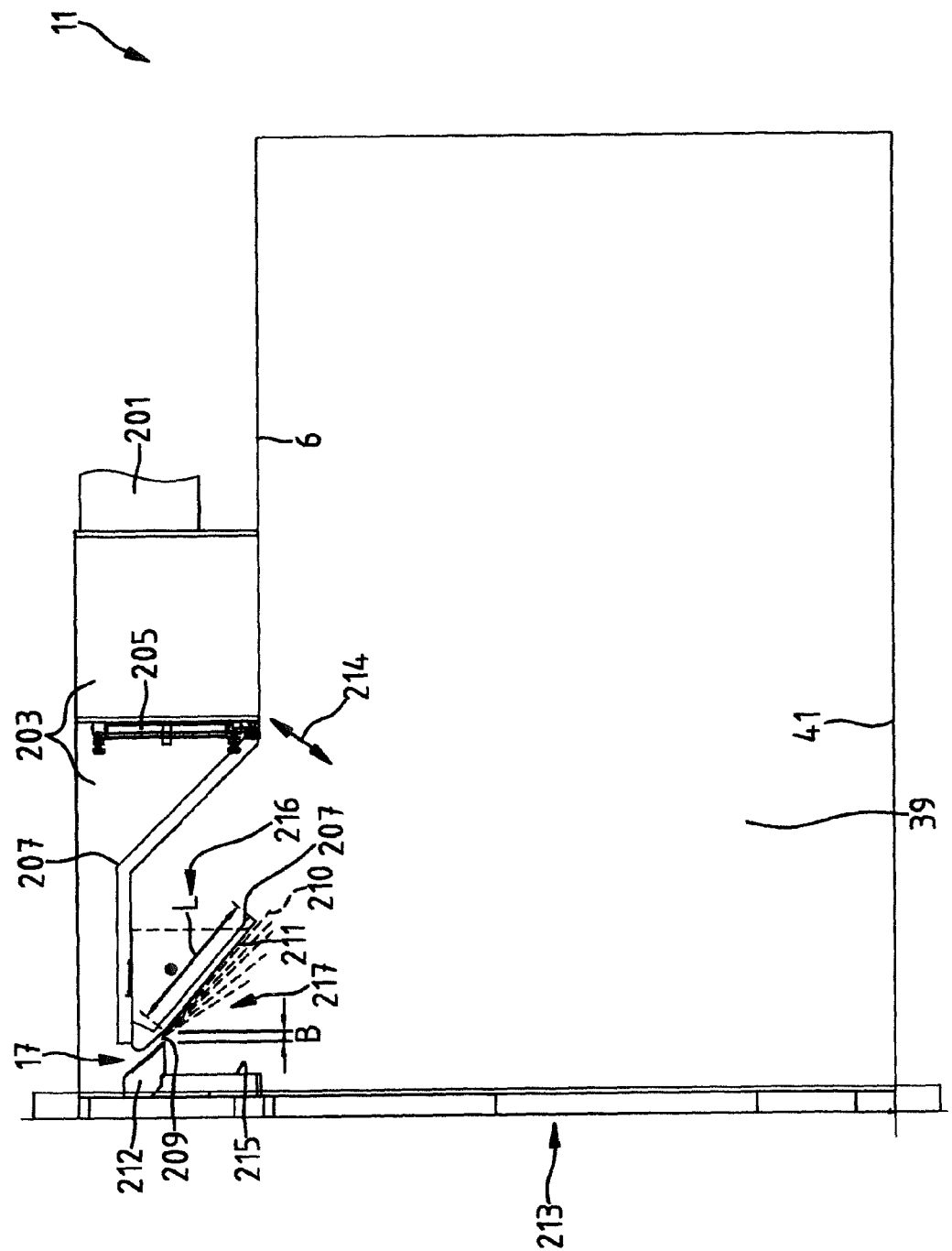
FIG. 2 is a longitudinal section of a lock of the drying installation.

FIG. 2 is a schematic sectional view of the intake lock 11 of the drying installation 1 from FIG. 1. The nozzle 17 in the intake lock 11 is a slot nozzle. The nozzle 17 is supplied with the fresh air, heated in the heating device 44, by way of a pipeline 201. The pipeline 201 opens out into a chamber 203. In the chamber 203, the fresh air is directed to the nozzle 17 by way of an air filter 205 and an obliquely arranged housing baffle 206. In the lock, there is a guide baffle 207. The guide baffle 207 is fixedly connected to a housing baffle 206. The guide baffle 207 and the housing baffle 206 can be pivoted in the lock 11 about a rotational axis 208 in the direction of the arrow 214. The pivoting of the guide baffle 207 with housing baffle 206 opens an access to the filter 205, in order that, maintenance work can be carried out there. The nozzle 17 has a slot-shaped opening 209. The slot-shaped opening 209 of the nozzle 17 is arranged set back with respect to the ceiling 6 of the drying tunnel 5. This makes it possible to avoid affecting or damaging a not yet dried coating of vehicle bodies that are moved through the intake lock 11 into the drying tunnel 5 even in the case of high flew rates of a fluid flew leaving the nozzle 17. Important for avoiding such damage is a comparatively large distance from the opening 209 of the nozzle 17 to the floor 41 of the drying tunnel 5. This can be achieved by a set-back arrangement of the nozzle 17 in the drying tunnel 5. This ensures that, in the middle of the drying tunnel, the pulse of the gaseous fluid flowing from the nozzle 17 has already diminished to such an extent, that coatings of vehicle bodies 3 cannot be damaged by the fluid flow curtain 21.

The fluid flow 210 leaving the opening 209 of the nozzle 17 is guided along the contour 211 of the guide baffle 207 acting as a guide vane into the interior of the drying tunnel 5. The length L of the contour 211 of the guide baffle 207 corresponds preferably to 20 to 40 times the slot width B of the nozzle opening 209.

On the side of the contour 211 that faces the intake opening or portal 213 of the drying tunnel 5, there is an end wall 215. The end wall 215 extends over the width of the lock 11. A diffuser 16 is delimited by the end wall 215, a ridge element 212 and the contour 211 of the guide baffle 207. The diffuser 16 is asymmetrically configured with reference to the primary flow plane 202 of the fluid which flows out the nozzle 17. The primary flow plane 202 and the contour 211 of the guide baffle 207 conjointly define an angle φ. The diffuser 16 has a section which acts as a mixing chamber 217 for gaseous fluid. The section of the diffuser 16, which acts as a mixing chamber 217, is disposed on the side of the guide baffle 207, which side faces toward the end wall 215, between the end wall 215 and the plane 204, which is symmetrical to the primary flow plane 202. The plane 204 and the guide baffle 207 conjointly define an angle 2φ. The mixing chamber 217 is arranged set back with respect to the ceiling 6 of the drying tunnel 5. The diffuser 16 with the mixing chamber 217 is arranged in the lock 11 above the intake opening or portal 213. The mixing chamber 217 is next to the intake opening 213. The guide baffle 207 with the contour 211 separates the mixing chamber 217 from a secondary chamber 216. The secondary chamber 216 opens into the interior 39 of the drying tunnel 5. The secondary chamber 216 forms a dead space for air from the drying tunnel 5. The secondary chamber formed on the rear side of the guide baffle having the guide contour 211 brings about the effect that the fluid flow 210 is guided on the guide contour 211 without flow separation because of the Coanda effect.

Figure 3:
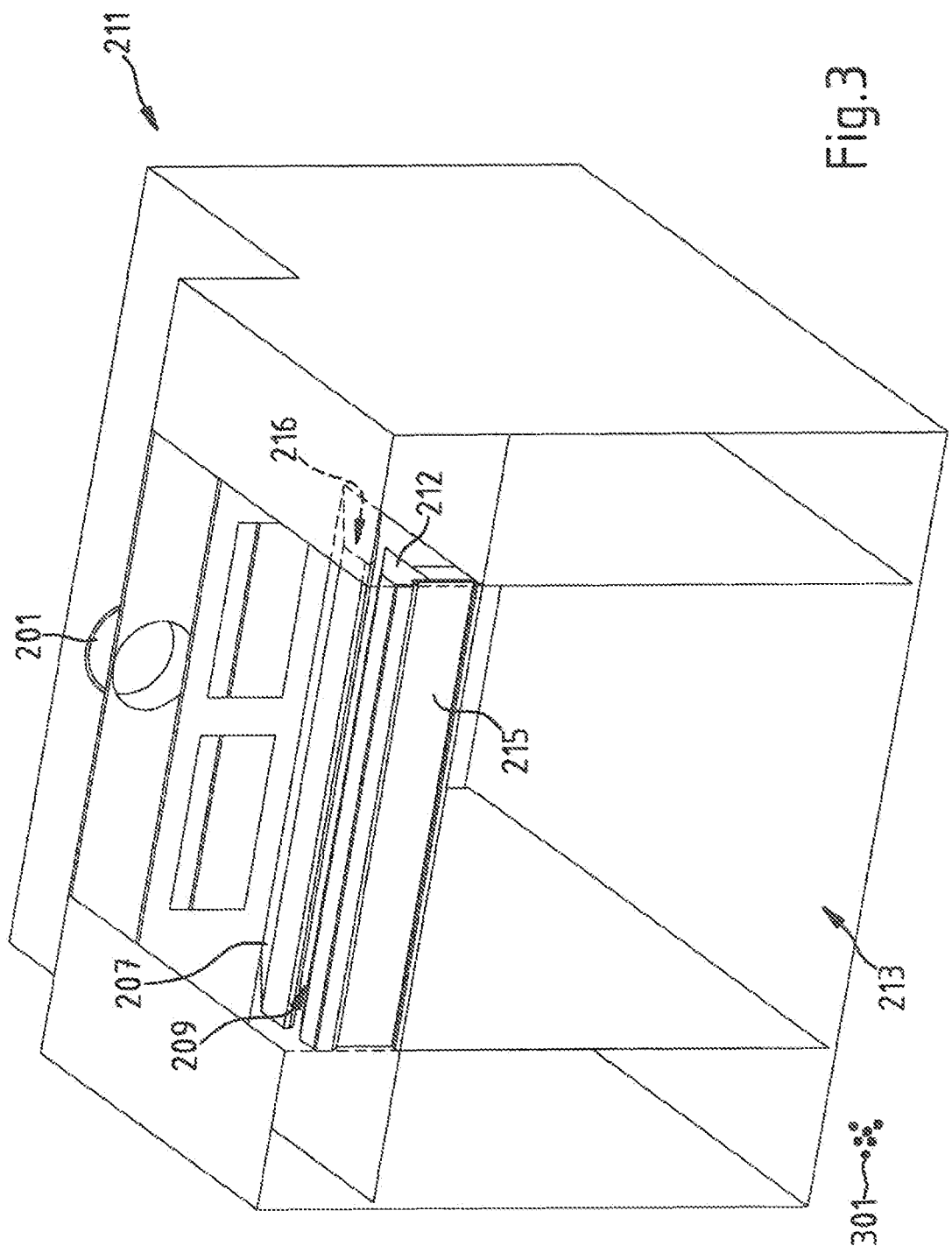
FIG. 3 is a three-dimensional view of the lock of FIG. 2.

FIG. 3 is a three-dimensional view of the intake lock 11 from FIG. 2. The slot-shaped opening 209 of the nozzle 17 extends over the entire width of the intake opening 213 of the drying tunnel 5. The slot-shaped opening 209 of the nozzle 17 is in this case so narrow that the fluid flow leaving the nozzle 17 forms a fluid flow curtain over a wide flow range with different discharge rates. This fluid flow particularly prevents an Ingress of dirt particles 301 from the surroundings of the drying installation 1, which is shown in FIG. 1, into the interior of the drying tunnel 5.

Figure 4:
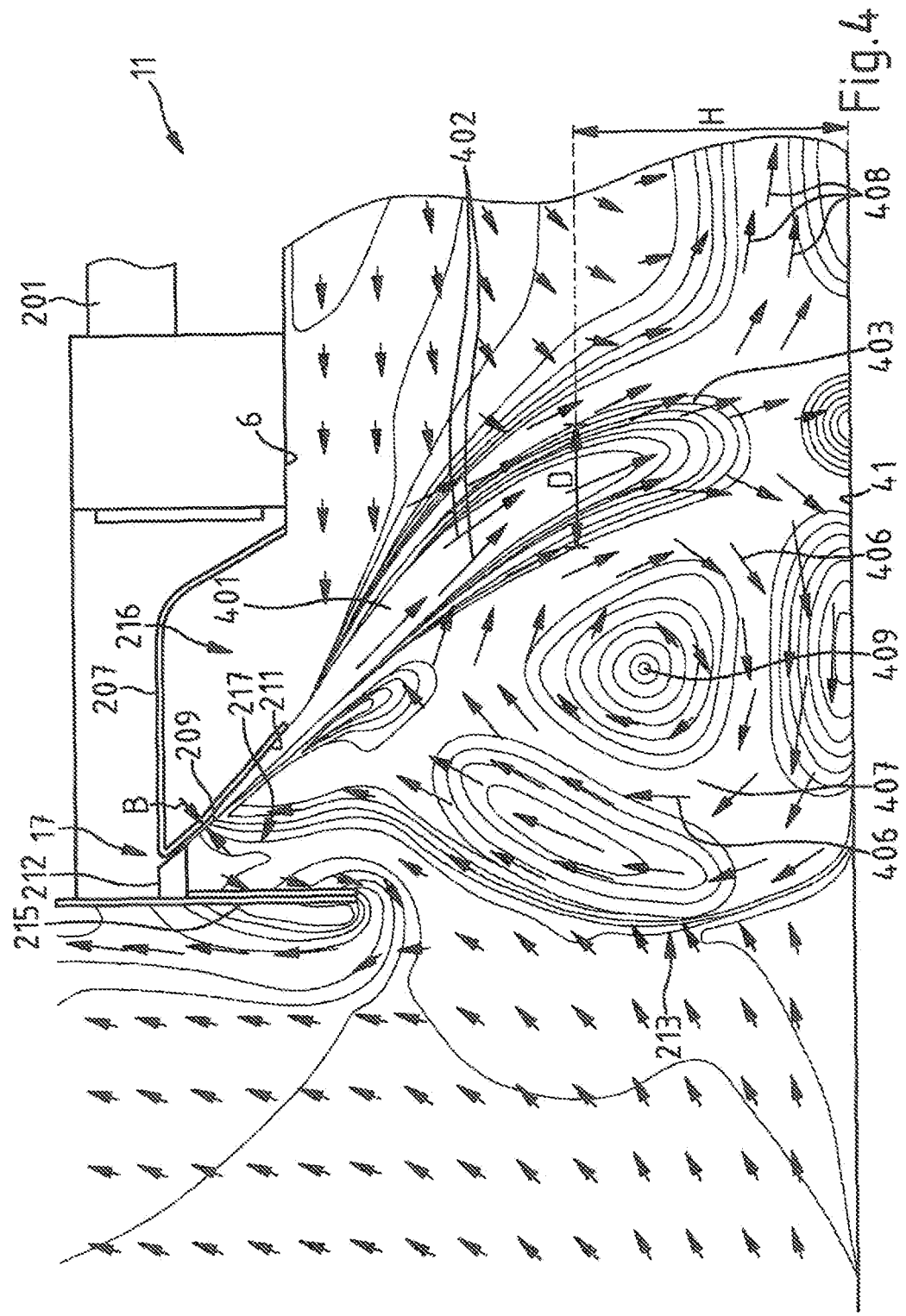
FIG. 4 shows the flow conditions for air in the region of the lock.

FIG. 4 shows by arrows the flow conditions for air in the intake lock 11 in the plane of a longitudinal section of the drying tunnel 5 from FIG. 1. The fresh air supplied to the drying tunnel 5 by way of the slot-shaped nozzle 17 brings about the effect of the fluid flow curtain 401 on the outlet side of the nozzle 17. Starting from the opening 209 of the nozzle 17, the fluid flow curtain 401 extends in the direction of the arrows 402 of flowing fresh air in the form of a curved lobe 403 to the floor 41 of the intake lock 11. The lobe 403 has at the height H of the middle of the intake lock 11 a thickness D, which is determined by the width B of the opening 209 of the nozzle 17. On the side of the fluid flow curtain 401 that is facing the intake opening or portal 213 of the drying tunnel 5, the fresh air flowing from the nozzle 17 produces a flow vortex 407 of air. In the flow vortex 407, the air flows around a center 409 with a direction of flow that is indicated by the arrows 406. The air in the region of the center 409 is substantially unmoved. The air circulated in the flow vortex 407 is at least partially mixed with the fresh air injected by way of the nozzle 17. The flow vortex 407 extends from the floor 41 to the ceiling 6 of the intake lock 11.

The mixing chamber 217, defined by the end wall 215 on the side of the guide baffle 207 facing the intake opening 213 and by the guide baffle 207 and the ridge element 212, in this case takes in a small part of the air circulated in the flow vortex 407, In the mixing chamber 217, this air is to a great extent entrained by the gaseous fluid flowing from the opening 209 of the nozzle 17 and mixed with it. This increases the volumetric flow of the fluid curtain 401 in the region of the arrows 402. Thus, 30% or more of the volumetric flow of the fluid flow curtain 401 may consist of gaseous fluid that is supplied to the fluid flew from the nozzle 17 by way of the mixing chamber 217. This has the consequence that, even with a comparatively small amount of injected fresh air, a fluid flow curtain 401 extending down to the floor 41 of the drying tunnel 5 can be produced.

The air from the mixing chamber 217 is in this way returned to the flow vortex 407. This process has the consequence that only a small proportion of the gaseous fluid supplied by way of the nozzle 17 into the interior space 39 of the drying tunnel 5 leaves again through the opening or portal 213 of the lock 11 of the drying tunnel 5. The gaseous fluid flowing from the nozzle 17 consequently passes to the greatest extent into the interior of the drying tunnel 5 in a way corresponding to the direction of the arrows 408. By means of the gaseous fluid flowing from the nozzle 17, a barrier with air circulated in the flow vortex 407 is produced in the region of the opening 213 of the lock 11. This barrier brings about the effect of a thermal separation of the interior space 39 of the drying tunnel 5 from the region outside. In addition, this barrier also prevents the ingress of dust and dirt particles into the interior space 39 of the drying tunnel 5.

Figure 5:
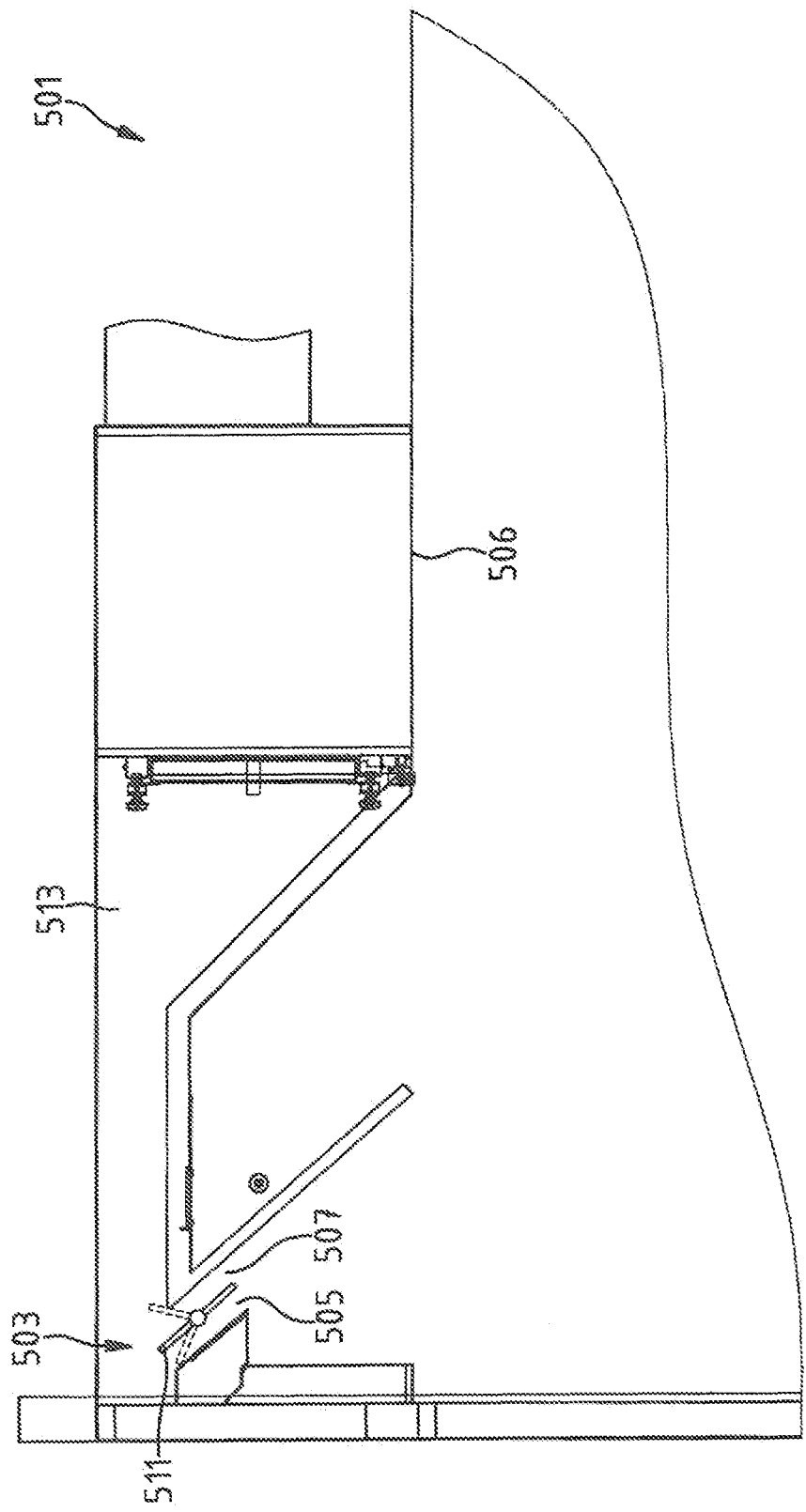
FIG. 5 shows a longitudinal section of a further lock for a drying installation.

FIG. 5 shows a modified embodiment of a lock 501 for a drying installation. The lock 501 has a nozzle 503 for supplying fresh air, with a nozzle geometry that is modified in comparison with the lock 11 from FIG. 1. The nozzle 503 is a dual-chamber nozzle. The nozzle 503 has a slot-shaped nozzle opening 505 and a slot-shaped nozzle opening 507 and each extends over the entire width of the ceiling 506 of the intake lock 501. The nozzle 503 comprises a pivotable control flap 511.

The control flap 511 is movable by a spindle drive. However, an adjusting mechanism with a shaft or a cable control is also suitable for the moving of the control flap. Pivoting of the control flap 511 allows the fresh air supplied to the nozzle 503 by way of the chamber 513 to be guided selectively through the nozzle opening 507, through the nozzle opening 505 or through the nozzle openings (507, 505) simultaneously. This makes it possible to meter the air flow leaving the nozzle openings (507, 505). For example, it is possible by means of the control flap 511 to vary the air flow from the nozzle 503 in a way corresponding to the position of vehicle bodies in the region of the intake opening of a drying tunnel. This measure can achieve the effect that a layer of paint applied to a vehicle body is not impaired by the fluid flow formed by fresh air from the nozzle 503. Furthermore, the thickness D of the fluid flow curtain, and consequently the amount and/or the rate of the fresh air supplied to the interior of the drying tunnel, can be set with the control flap 511.

In the case of a modified design of the intake lock 501, a nozzle with multiple nozzle openings and with multiple control flaps may also be provided in order to set the fresh air flow for a drying tunnel.

Figure 6:
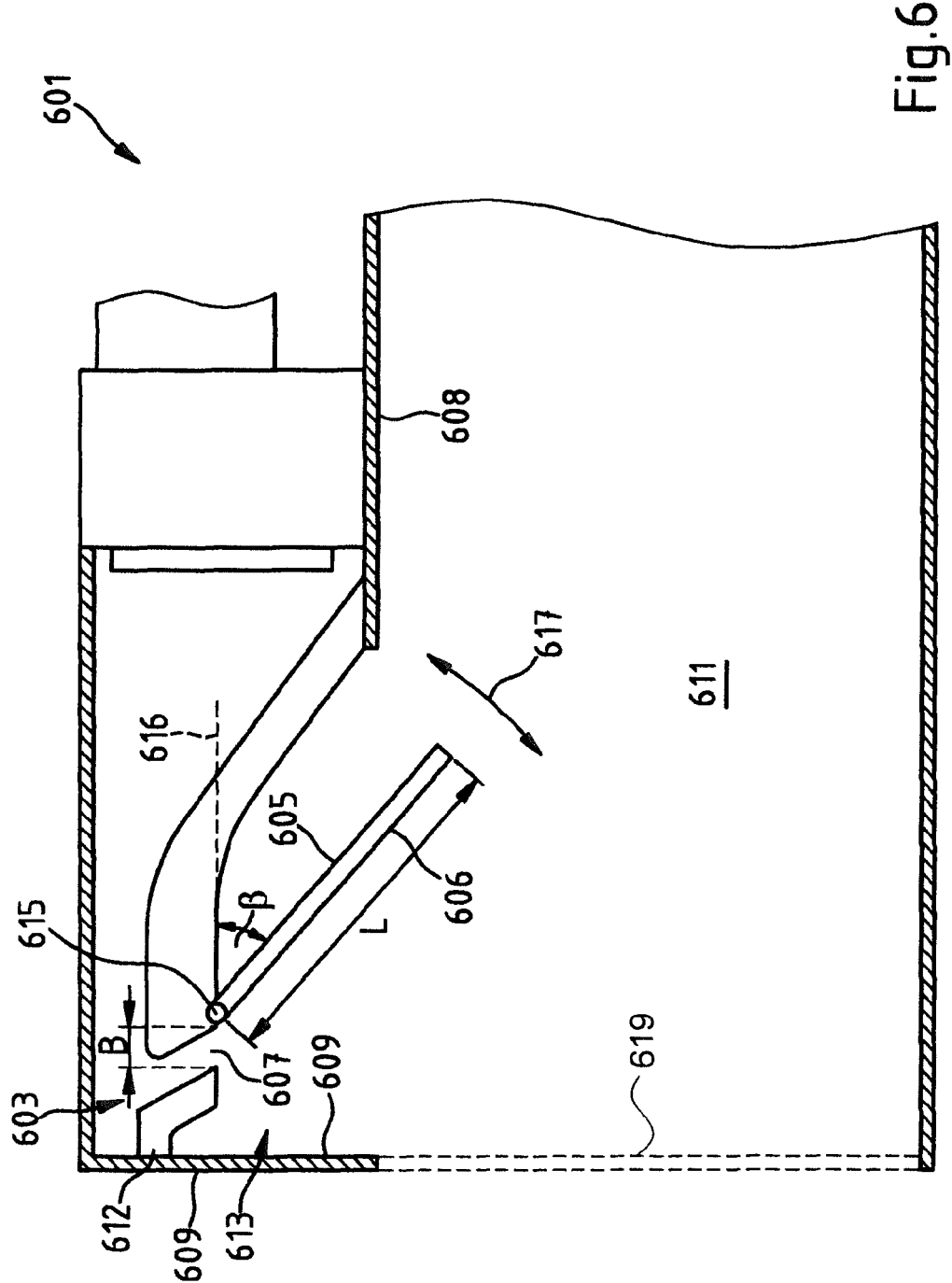
FIGS. 6 to 8 show parts of further longitudinal sections of alternative embodiments for locks in a drying installation.

FIG. 6 shows a part of an alternative embodiment for a lock 601 with a nozzle 603 in order to form an air curtain in the intake or exit region of the drying installation.

The nozzle 603 in the lock. 601 is assigned a baffle 605, which acts as a directing vane and is preferably pivotably arranged. The baffle optionally has an at least partly curved outer contour. In particular, the baffle extends over the entire width of the nozzle 603. The pivotable baffle 605 at the opening 607 of the nozzle 603 is pivotably mounted on the ceiling 608 of the lock 601 at a pivot joint 615. The pivotable baffle 605 protrudes into the interior 611 of the lock 601. The length L of the contour of the baffle 505 corresponds approximately to 20 to 40 times the slot width B of the nozzle opening. Arranged opposite the pivotable baffle 605 in the lock 601 there is, in turn, an end wall 609. Here too, the pivotable baffle 605 and the end wall 609, together with a ridge element 612, define a mixing chamber 613. On account of the pivotability of the baffle 605, the geometry of the mixing chamber 613 in the case of the lock 601 can be changed.

For the pivoting, the baffle 605 is assigned an actuating drive that is not shown any further. The pivoting of the baffle 605 in a way corresponding to the double-headed arrow 617 makes it possible to set an angle of incidence β with respect to the horizontal 616, and consequently the direction of a fluid flow curtain produced with gaseous fluid from the nozzle 603 in the lock 601. Pivoting has the effect of shifting the contour of the guide vane which is formed by the baffle 605 and on which the gaseous fluid flowing from the nozzle 603 is guided. This allows the form of the flow vortex that is formed as a result of the fluid flowing from the nozzle 603 on the side 606 of the baffle 605 that is facing the opening 619 to be changed. If the baffle 605 is pivoted toward the ceiling 608 of the lock 601, a comparatively shallow inflow of gaseous fluid into the lock can be brought about. The moving up and down of the baffle 605 allows the direction of flow of the fluid flowing from the nozzle to be adapted to the position and geometry of vehicle bodies that are moved through the lock 601 into the interior of the drying tunnel. This allows the effect to be achieved that a layer of paint applied to vehicle bodies and intended to be dried in the drying tunnel is not blasted and damaged in the drying tunnel.

Figure 7:
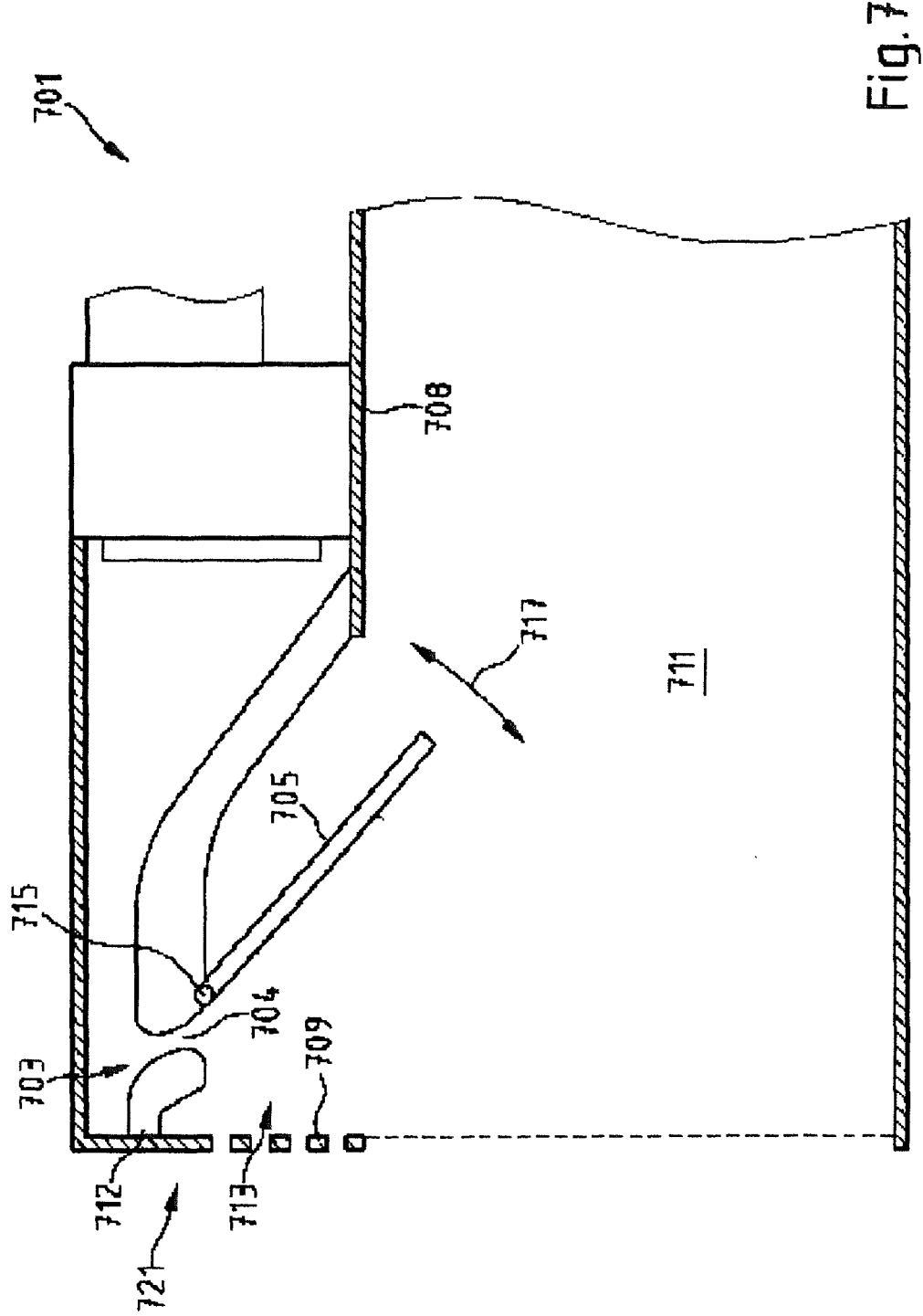

FIG. 7 shows a part of a further alternative embodiment for a lock 701 with a nozzle 703 in order to form an air curtain in the intake or exit region of a drying installation. The nozzle 703 has a diffuser, which adjoins the narrowed cross section of the nozzle and thus widens the flow cross section for the fluid. The nozzle 703 with the adjoining diffuser therefore has a flow channel 704, the cross section of which widens toward the interior 711 of the lock 701. Otherwise, the structure of the lock 701 corresponds to that of the lock 601 from FIG. 6.

Therefore, assemblies of the locks 501 and 701 that correspond to one another are indicated in FIG. 7 by reference numerals increased by the number 100 in comparison with FIG. 6. Unlike the end wall 609 of the lock 601 in FIG. 6, the lock 701 has an end wall 709 with one or more inlet openings for ambient air. The end wall 709 preferably has openings in the form of a screen-like perforation. This measure likewise makes it possible to take in air from an upper region 721 of the surroundings of the lock 701. The air drawn into the lock 701 in such a way is preferably mixed with air from a flow vortex that forms at the opening of the lock. The air drawn in and some of the air of the flow vortex are subsequently mixed into the fluid flow leaving the diffuser.

Figure 8:
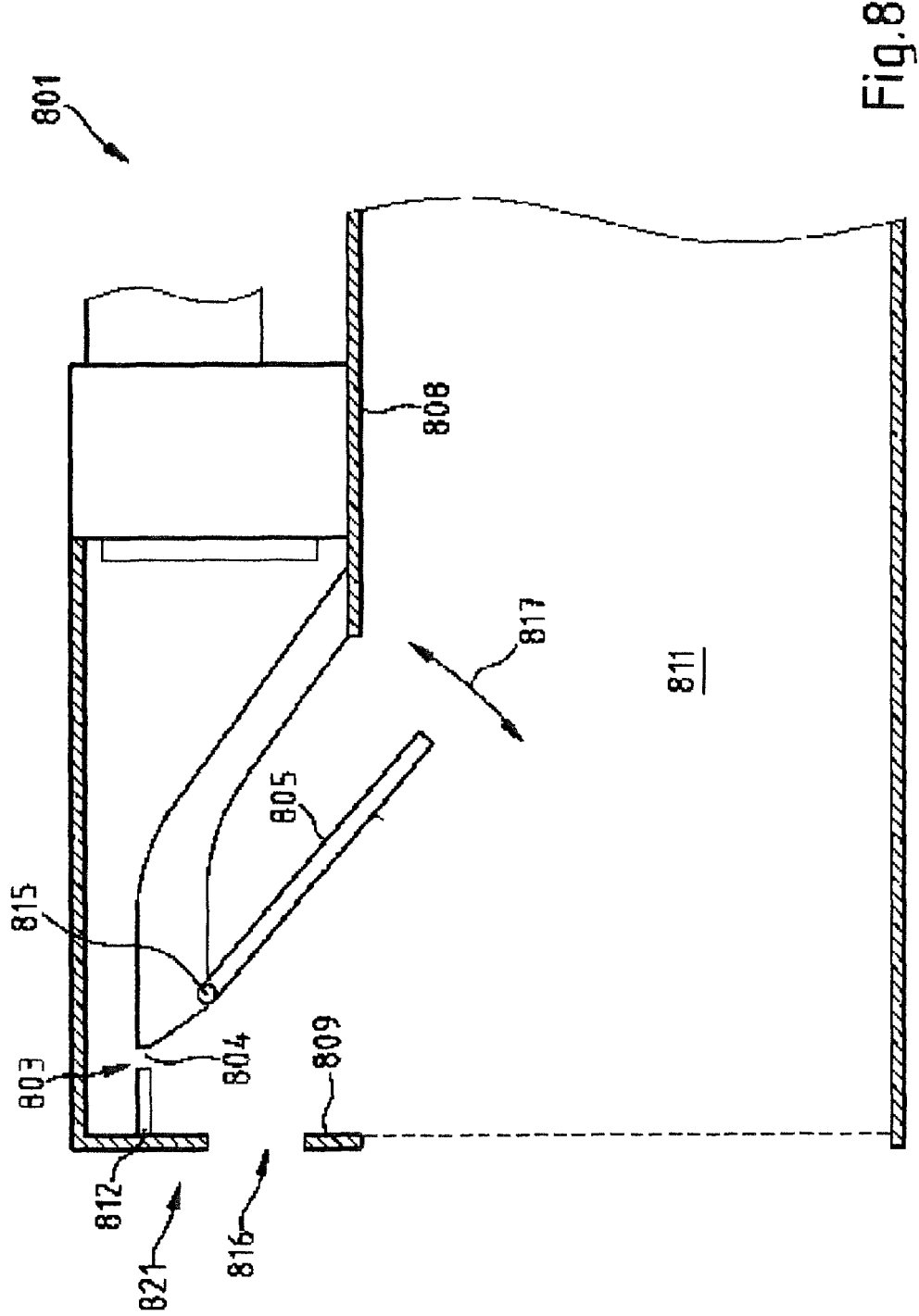

FIG. 8 shows a part of a further alternative embodiment for a lock 801 with an aperture 803 defining an opening 804 in order to form an air curtain in the intake or exit region of a drying installation. The structure of the lock 801 corresponds to that of the lock 701 from FIG. 7. Therefore, assemblies of the locks 701 and 801 that correspond to one another are indicated in FIG. 8 by reference numerals increased by the number 100 in comparison with FIG. 7. Unlike the end wall 709 of the lock 701 in FIG. 7, the end wall 809 of the lock 801 is embodied with an opening 816. This measure likewise makes it possible for air to be taken in from an upper region 821 of the surroundings of the lock 801 into the flow vortex at the opening of the lock that is formed by means of the aperture 803.

Figure 9:
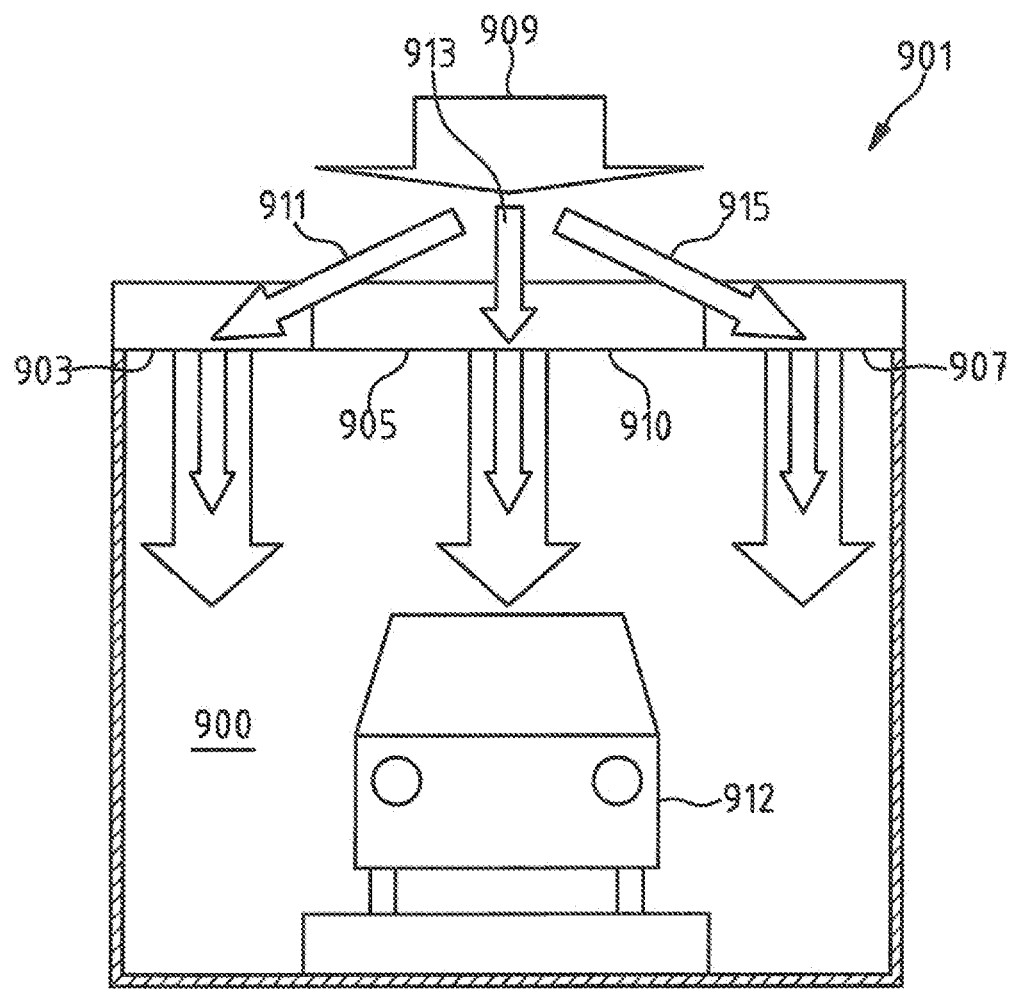
FIG. 9 shows a cross section of a drying tunnel in a drying installation.

FIG. 9 shows a cross section of an intake or exit lock 901 of a drying tunnel 900 in a drying installation with a vehicle body 912, The lock 901 has slot-shaped nozzles (903, 905, 907), which are located on the ceiling 910 of the lock 901. The nozzles (903, 905, 907) may be subjected to a fresh air flow 909 by way of a device for supplying fresh air that is not represented any further in FIG. 9. In the lock 901 there are control flaps, which permit the fresh air flow 909 to be divided among different channels 911, 913 and 915 for separately charging the nozzles 903, 905 and 907 with fresh air.

This measure makes it possible to set a fluid flow curtain at the openings of a drying tunnel that can be set differently over the width B of the opening in a way corresponding to the passing through of workpieces, for example vehicle bodies.

FIG. 10 shows a longitudinal section of a further lock 1011 for a drying tunnel in an installation for drying metallic workpieces. In a way corresponding to FIG. 4, here, too, the flow conditions for air in the lock 1011 are Indicated by arrows. The fresh air supplied to the drying tunnel by way of the slot-shaped nozzle 1017 brings about a fluid flow curtain 1401 on the outlet side of the nozzle 1017. The term "fresh air" may be understood as meaning in particular precompressed, heated and/or cleaned and/or dried air, the parameters of the state of which have been optimally set.

Starting from an opening 1209 of the nozzle 1017, the fluid flow curtain 1401 (of fresh air flowing in the direction of the arrows 1402) extends in the form of a more or less curved lobe 1403 in the direction of a floor 1041 of the lock 1011. On a side of the fluid flow curtain 1401 that is facing the intake opening 1213 of the lock 1011, the fresh air flowing from the nozzle 1017 produces a flow vortex 1407 of air. In the flow vortex 1407, the air flows around a center 1409 with a direction of flow indicated by the arrows 1406. The air in the region of the center 1409 is substantially unmoved. The air circulated, in the flow vortex 1407 is at least partially mixed with the fresh, air injected by way of the nozzle 1017. The flow vortex 1407 extends from the floor 1041 to the ceiling 1006 of the intake lock 1011.

The lock 1011 has on the side facing the intake opening 1213 of a baffle 1211 that has a directing contour to the opening 1209 of the nozzle 1017 a curved ridge wall 1215. The baffle 1211 and the ridge wall 1215 partly bound and enclose a downwardly open mixing chamber 1217. In the case of the embodiment shown in FIG. 10, positioned in the mixing chamber 1217 is a flow directing element 1218 in the form of a "flow vane", which preferably extends like the opening 1009 of the nozzle 1017 over the entire width of the lock 1011. The baffle 1211 separates the mixing chamber 1217 from a secondary chamber 1216. The secondary chamber 1216 acts as a dead space for air, in which there are lower flow rates than in the remaining lock (apart from the center of rotation 1409 of the flow vortex, which can actually be disregarded).

Arranged on the floor 1041 of the lock 1011 in the region of the opening 1213 is a silhouette wall 1220. The silhouette wall 1220 serves in particular as a flow barrier or as a flow directing element on the floor side. The silhouette wall 1220 preferably comprises a spring steel or other temperature- and/or corrosion-resistant steels. The silhouette wall 1220 can be pivoted or swung away about a (horizontal) axis 1222 in a way corresponding to the arrow 1224.

In accordance with the invention, the mixing chamber 1217 thereby takes in a small part of the air circulated in the flow vortex 1407. In the mixing chamber 1217, this air is diverted by the flow vane 1218 to the gaseous fluid flowing from the opening 1209 of the nozzle 17. The air is entrained by the gaseous fluid. This increases the volumetric flow of the fluid curtain 1401 in the region of the arrows 1402. The volumetric flow of the fluid flow curtain 1401 may comprise to a great extent gaseous fluid that is supplied to the fluid flow from the nozzle 1017 by way of the mixing chamber 1217. This has the consequence that, even with a comparatively small amount of injected fresh air, a fluid flow curtain 1401 extending down to the floor 1041 of the drying tunnel can be produced.

The air from the mixing chamber 1217 is in this way returned to the flow vortex 1407. This process has the consequence that only a small proportion of the gaseous fluid supplied by way of the nozzle 1017 into the interior space 1039 of the drying tunnel leaves again through the opening 1213 of the lock 1011 of the drying tunnel. The gaseous fluid flowing from the nozzle 1017 consequently passes to the greatest extent into the interior of the drying tunnel in a way corresponding to the direction of the arrows 1408. By means of the gaseous fluid flowing from the nozzle 1017, a barrier with air circulated in the flow vortex 1407 is produced in the region of the opening 1213 of the lock 1011, thermally separates the interior space 1039 of the drying tunnel from the region outside and, in addition, also prevents any ingress of dust and dirt particles into the drying tunnel. The silhouette wall 1220 at the floor 1041 of the lock 1011 brings about the effect that the flow vortex 1407 is comparatively narrow. Only when a workpiece is moved into the drying tunnel is the silhouette wall swung for a short time in the direction of the floor 1041 in a way corresponding to the arrow 1224.

To sum up, the following preferred features of the invention should be noted: a process chamber 5 has an interior space 39. In the interior space 39 there is a receiving region 15 for workpieces 3. The interior space 39 has a temperature that is increased or reduced relative to the surroundings of the process chamber. The process chamber has an at least temporarily opened opening (12, 14) for feeding in or discharging workpieces 3. The process chamber includes a device (17, 19, 25, 29, 33, 37, 35) for injecting gaseous fluid into the interior space 39. The device for injecting gaseous fluid has at least one nozzle (17, 19) for producing a fluid flow curtain (21, 23) between the opening (12, 14) and the receiving region 15 for workpieces 3. The supplied gaseous fluid is conditioned with regard to its physical and/or chemical parameters and has in particular a different temperature relative to the interior space of the process chamber and/or relative to the surroundings of the process chamber.

It is understood that the foregoing description is that of the preferred embodiments of the invention and that various changes and modifications may be made thereto without departing from the spirit and scope of the invention as defined in the appended claims.

What is claimed is:

1. A process chamber defining an interior space, the process chamber comprising:
    a ceiling and a floor conjointly defining a tunnel-shaped receiving region in said interior space for accommodating workpieces therein;
    a portal through which said workpieces are passed into or out from said receiving region;
    an arrangement for blowing a gaseous fluid into said interior space;
    said arrangement including a slit-shaped nozzle or aperture extending transversely to said interior space and being configured for generating a fluid flow curtain between said portal and said receiving region;
    said arrangement further including a guide contour disposed in said interior space;
    said guide contour defining a side facing toward said portal;
    said slit-shaped nozzle or aperture being configured to feed said gaseous fluid from above said ceiling into said interior space along said guide contour with a flow direction inclined with respect to said floor;
    a lock in said interior space facing toward said portal;
    said lock including a wall arranged facing toward said side of said guide contour;
    said wall and said guide contour conjointly delimiting a mixing chamber disposed above said portal and set back upwardly with reference to said ceiling wherein air accumulates originating from the region of said portal; and,
    said mixing chamber being configured so as to permit said gaseous fluid flowing from said slit-shaped nozzle or aperture to draw said air into said interior space and entrain said air in said mixing chamber to form said fluid flow curtain extending from said ceiling down to said floor of said tunnel-shaped receiving region.

2. The process chamber of claim 1, wherein said arrangement includes a pivotable guide vane and said guide contour is configured on said pivotable guide vane.

3. The process chamber of claim 1, wherein said wall includes at least one aperture for passing circulated air from the region of said portal.

4. The process chamber of claim 1, wherein said side of said guide contour is a first side thereof; said guide contour has a second side facing away from said mixing chamber; and, said arrangement further includes an ancillary chamber configured on said second side as a dead space for gaseous fluid.

5. The process chamber of claim 1, wherein a guide vane is mounted in said mixture chamber.

6. The process chamber of claim 1, said arrangement further comprising a nozzle assembly including said slit-shaped nozzle and a device for adjusting the flow quantity passing through said slit-shaped nozzle so as to permit different adjustments of said fluid flow curtain in different stages.

7. The process chamber of claim 6, wherein said nozzle assembly includes a plurality of said slit-shaped nozzles; and, said device is configured to adjust the quantity of fluid passing through said plurality of slit-shaped nozzles so as to permit different adjustments of said fluid flow curtain in different stages.

8. The process chamber of claim 1, further comprising a pivotable flow barrier for controlling a fluid flow formed in said interior space.

9. The process chamber of claim 1, wherein said arrangement for blowing said gaseous fluid into said interior space includes a heating device for heating the gaseous fluid.

10. A system for performing at least one of the following processes: drying, hardening or painting; the system comprising:
- a process chamber defining an interior space;
- a ceiling and a floor conjointly defining a tunnel-shaped receiving region in said interior space for accommodating workpieces therein;
- a portal through which said workpieces are passed into or out from said receiving region;
- said process chamber including an arrangement for blowing a gaseous fluid into said interior space;
- said arrangement including a slit-shaped nozzle or aperture extending transversely to said interior space and being configured for generating said fluid flow curtain between said portal and said receiving region;
- said arrangement further including a guide contour disposed in said interior space;
- said guide contour defining a side facing toward said portal;
- said slit-shaped nozzle or aperture being configured to feed said gaseous fluid from above said ceiling into said interior space along said guide contour with a flow direction inclined with respect to said floor;
- a lock in said interior space facing toward said portal;
- said lock including a wall arranged facing toward said side of said guide contour;
- said wall and said guide contour conjointly delimiting a mixing chamber disposed above said portal and set back upwardly with reference to said ceiling wherein air accumulates originating from the region of said portal; and,
- said mixing chamber being configured so as to permit said gaseous fluid flowing from said slit-shaped nozzle or aperture to draw said air into said interior space and entrain said air in said mixing chamber to form said fluid flow curtain extending from said ceiling down to said floor of said tunnel-shaped receiving region.

11. A method for operating a process chamber defining an interior space, the process chamber including: a ceiling and a floor conjointly defining a tunnel-shaped receiving region in said interior space for accommodating workpieces therein; a portal through which said workpieces are passed into or out from said receiving region; an arrangement for blowing a gaseous fluid into said interior space; said arrangement including a slit-shaped nozzle or aperture for generating a fluid flow curtain between said portal and said receiving region; said slit-shaped nozzle or aperture being configured to feed said gaseous fluid from above said ceiling into said interior space along a guide contour with a flow direction inclined with respect to said floor; and, a lock in said interior space facing toward said portal; the method comprising the steps of:
- feeding said gaseous fluid into said interior space with a direction inclined with respect to said floor;
- generating a flow vortex made up of air mixed at least in part with the blown-in gaseous fluid on the side of said fluid flow curtain facing toward said portal with said flow vortex extending from said floor to said ceiling in said lock;
- providing a guide contour having a side facing toward said portal;
- conducting said gaseous fluid via said slit-shaped nozzle or aperture along said guide contour into said interior space;
- providing a wall arranged facing toward said side of said guide contour;
- delimiting a mixing chamber with said wall and said guide contour;
- mixing fluid from said flow vortex with air from the region of said portal to form a mixture; and,
- causing the gaseous fluid flowing from said slit-shaped nozzle or said aperture to draw the mixture into said interior space to entrain said mixture in said mixing chamber to form said fluid flow curtain.

12. The method of claim 11, wherein said gaseous fluid blown in through said nozzle or aperture is guided on said guide contour with an occurrence of flow separation.

13. The method of claim 11, wherein said guide contour is pivoted for adjusting said fluid flow curtain.

14. The method of claim 11, wherein said fluid flow curtain is throttled or interrupted between said portal and said receiving region for said workpieces.

15. The method of claim 14, wherein the direction of said fluid flow curtain is changed when a workpiece is moved through said portal.

16. The method of claim 11, wherein the direction of said fluid flow curtain is changed when a workpiece is moved through said portal.

* * * * *